US010696186B2

(12) United States Patent
Wilson et al.

(10) Patent No.: US 10,696,186 B2
(45) Date of Patent: Jun. 30, 2020

(54) OCCUPANT DETECTION SYSTEM

(71) Applicant: Joyson Safety Systems Acquisition LLC, Auburn Hills, MI (US)

(72) Inventors: David Wilson, Clarkston, MI (US); Phillip Maguire, Bloomfield Township, MI (US)

(73) Assignee: Joyson Safety Systems Acquisition LLC, Auburn Hills, MN (US)

( * ) Notice: Subject to any disclaimer, the term of this patent is extended or adjusted under 35 U.S.C. 154(b) by 0 days.

(21) Appl. No.: 16/101,188

(22) Filed: Aug. 10, 2018

(65) Prior Publication Data

US 2019/0047441 A1    Feb. 14, 2019

Related U.S. Application Data

(60) Provisional application No. 62/543,627, filed on Aug. 10, 2017.

(51) Int. Cl.
*G08B 21/00* (2006.01)
*B60N 2/00* (2006.01)
*B60R 21/015* (2006.01)

(52) U.S. Cl.
CPC ........ *B60N 2/002* (2013.01); *B60R 21/01532* (2014.10)

(58) Field of Classification Search
None
See application file for complete search history.

(56) References Cited

U.S. PATENT DOCUMENTS

| 5,376,913 | A | 12/1994 | Pine et al. | |
|---|---|---|---|---|
| 6,010,771 | A | 1/2000 | Isen et al. | |
| 6,283,504 | B1 * | 9/2001 | Stanley | B60N 2/002 180/272 |
| 7,217,891 | B2 * | 5/2007 | Fischer | B60N 2/002 177/144 |
| 7,391,342 | B1 | 6/2008 | Mui | |

(Continued)

FOREIGN PATENT DOCUMENTS

WO    WO 2014/132018 A1    9/2014

OTHER PUBLICATIONS

International Search Report and Written Opinion issued in International Application No. PCT/US2018/046353; dated Aug. 10, 2018.

*Primary Examiner* — Julie B Lieu
(74) *Attorney, Agent, or Firm* — Gordon Rees Scully; Mansukhani, LLP

(57) ABSTRACT

A system for detecting the presence of an occupant of a seat. The system includes a sensing mat that includes an upper conducting layer and a lower conducting layer. At least one of the conducting layers comprises a printed electronic circuit separated into conductive zones by at least one resistive zone. The mat also includes a plurality of sensing zones and each of the sensing zones include a conductive zone from the upper conducting layer and a conductive zone from the lower conducting layer. Each of the conducting layers are connected to a controller configured to detect a change in capacitance of each of the sensing zones resulting from a change in distance between the upper conducting layer and the lower conducting layer. The controller is connected to a vehicle network and is configured to provide data to the network that indicates the absence or presence of the occupant.

20 Claims, 6 Drawing Sheets

(56) References Cited

U.S. PATENT DOCUMENTS

| | | | | |
|---|---|---|---|---|
| 7,500,536 | B2* | 3/2009 | Bulgajewski | H05B 3/34 |
| | | | | 177/136 |
| 7,578,195 | B2* | 8/2009 | DeAngelis | G01L 1/146 |
| | | | | 324/687 |
| 7,897,884 | B2 | 3/2011 | Harish | |
| 2001/0054323 | A1* | 12/2001 | Faigle | B60N 2/002 |
| | | | | 73/862.391 |
| 2002/0003345 | A1* | 1/2002 | Stanley | B60N 2/286 |
| | | | | 280/735 |
| 2006/0005630 | A1* | 1/2006 | Jitsui | B60R 21/01532 |
| | | | | 73/779 |
| 2006/0066085 | A1* | 3/2006 | DuRocher | B60R 21/01532 |
| | | | | 280/735 |
| 2006/0185446 | A1* | 8/2006 | Speckhart | G01G 19/4142 |
| | | | | 73/862.391 |
| 2007/0248799 | A1* | 10/2007 | DeAngelis | G01L 1/146 |
| | | | | 428/209 |
| 2008/0100425 | A1* | 5/2008 | Kiribayashi | B60N 2/002 |
| | | | | 340/425.5 |
| 2010/0038351 | A1* | 2/2010 | Tabaczynski | H05B 1/0238 |
| | | | | 219/202 |
| 2011/0074447 | A1* | 3/2011 | Ootaka | B60N 2/002 |
| | | | | 324/679 |
| 2011/0240751 | A1* | 10/2011 | Rauh | B64D 13/00 |
| | | | | 236/91 D |
| 2011/0241860 | A1* | 10/2011 | Andrews | B60N 2/002 |
| | | | | 340/438 |
| 2013/0213950 | A1* | 8/2013 | Bulgajewski | H05B 1/00 |
| | | | | 219/209 |
| 2015/0177077 | A1 | 6/2015 | Hanson et al. | |
| 2018/0022233 | A1* | 1/2018 | Maguire | B60N 2/002 |
| | | | | 701/46 |

* cited by examiner

OCCUPANT DETECTION SYSTEM

CROSS REFERENCE TO RELATED APPLICATIONS

The present application claims the benefit of and priority to U.S. Provisional Patent Application No. 62/543,627 filed on Aug. 10, 2017. The foregoing provisional application is incorporated by reference herein in its entirety.

BACKGROUND

The present application relates to a system for detecting the presence of an occupant of a seat. More particularly, the application relates to a capacitive sensing system for detecting the presence of a person. In a disclosed embodiment, the system is used for detecting the presence of an occupant in a vehicle seat.

Conductive ink screen printing as well as other methods of delivery have been used to print conductors for use in sensing pads. However, the present application discloses the additional novel approach of creating multiple sensing zones in the sensing pad by printing or screening one or more resistive zones in series with the conductive trace. For example, the present application discloses printing or screening highly conductive material (e.g., silver (Ag)) with varying gaps. A lower conductive carbon based material may be screened over the silver and the gap to create a resistive zone that acts as a resistor in series. The resistive zones' resistance values may be controlled by a number of factors, such as gap length, carbon geometry, etc. A discrete resistor network may be designed using the printing process. The value of each resistive zone could be the same or different depending on system operation and configuration.

For example, the system may be formed using just two different conductivity screen/print inks to create multiple resistive zones of different resistive values to use in forming a network of sensing zones. A highly conductive silver ink and a much less conductive carbon ink may be printed to create a single sheet, multi-zone network that could be used to sense occupant location in a seat. The present application discloses this novel approach to construction of a network of resistive zones (and thereby multiple sensing zones) on a single substrate or base layer.

Existing multi-zone sensors are very complicated with many electric connectors or terminals to account for the multiple zones. For instance, each zone may require one or more electric connector making the systems less reliable and more costly. The present application discloses an improved method of connecting the sensing zones together in an integrated fashion by using resistive material.

By connecting the various sensing zones together via a resistor network, the controller may be configured to determine the zones that are active (i.e., sensing the presence of an occupant) and how much weight is being applied using methods and technology that is similar to that employed in existing capacitive or electric field sensors. With a network of resistive zones acting as resistors in series with the sensing zones, only two electronic connectors are required for potentially any number of zones. The system is only limited by the number of resistors and sensing zones that could be isolated and analyzed by the associated hardware and software.

The disclosed system uses an inexpensive combination of conductive inks to manufacture the system. The use of well-known and understood manufacturing processes fits well with timing, quality and cost for such a system. The reduction of electronic connectors increases reliability of the system significantly and reduces the wire and connector content. All of these benefits lead to a very affordable system with greater capability to detect and distinguish occupant size and position for airbag deployment.

It would be desirable to have a system that uses an inexpensive combination of conductive and resistive inks and a reduced number of electronic connectors in order to produce a more economical occupant detection system.

SUMMARY

Disclosed and claimed herein is a system for detecting the presence of an occupant of a seat. A disclosed embodiment is directed to a system that includes a sensing mat configured to be located in the seat, the mat including an upper conducting layer and a lower conducting layer, wherein at least one of the conducting layers comprises a printed electronic circuit separated into conductive zones by resistive zones; wherein the mat includes a plurality of sensing zones and each of the sensing zones include a conductive zone from the upper conducting layer and a conductive zone from the lower conducting layer, and wherein each of the two conducting layers are connected to a controller configured to detect a change in capacitance of each of the sensing zones resulting from a change in distance between the upper conducting layer and the lower conducting layer; and wherein the controller is connected to a vehicle network and is configured to provide data to the network and wherein the data indicates the absence or presence of the occupant in the seat.

Each of the resistive zones may include a resistive material printed on to one of the conducting layers. Each of the conductive zones may include a conductive material printed on to one of the conducting layers. An electronic circuit may be configured to carry a signal through at least two conductive zones and at least one resistive zone located between the at least two conductive zones. Each of the conductive layers may include electronic connectors or terminal for connecting the sensing mat to a wire harness to establish connectivity with the controller. Alternatively, the sensing mat may be directly connected to a controller.

The controller, having analyzed the received signals, may be configured to provide further data to the network wherein the further data indicates the position of the occupant in the seat based on the multi-zone arrangement of the sensing mat or pad. Each sensing zone, having sensed an occupant of the seat in that zone, provides a unique change to the impedance of the signal carried through the electronic circuit. The controller may be configured to determine which sensing zones are proximate to the occupant based on the total impedance impact on the signal.

One disclosed embodiment includes an electrical circuit component, wherein the electrical circuit component is printed onto a substrate, comprising a conductive material printed onto the substrate so that at least one gap exists between sections of the conductive material and a resistive material printed onto the substrate in a position to bridge the gap between the sections of the conductive material, wherein the resistance value of the resistive material is controlled by adjusting the shape of the resistive material or the size of the gap. In another embodiment, the electrical circuit component is configured to carry an electrical signal through the sections of conductive material and across the gap through the resistive material. The conductive material may comprise silver and the resistive material may comprise carbon.

The resistive material may be printed in a zig zag or wave pattern. In another embodiment, the thickness of the resistive material located in the gap is less than each of the sections of the conductive material.

Another disclosed embodiment includes an electrical circuit, wherein the electrical circuit is printed onto a substrate, comprising a conductive material printed onto the substrate so that a plurality of gaps exist between sections of the conductive material and a resistive material printed onto the substrate in a position to bridge the plurality of gaps between the sections of the conductive material. The resistance value of the resistive material for each gap in the plurality of gaps may be individually controlled by adjusting the shape of the resistive material or the size of each gap in the plurality of gaps and the electrical circuit may be configured to carry an electrical signal through the sections of conductive material and across the plurality of gaps through the resistive material. The conductive material may comprise silver and the resistive material may comprise carbon. The resistive material bridging the at least one of the plurality of gaps may be printed in a zig-zag or wave pattern amongst other options. The thickness of the resistive material bridging at least one of the plurality of gaps may be less than each of the sections of the conductive material.

Other aspects, features, and techniques will be apparent to one skilled in the relevant art in view of the following detailed description of the embodiments.

BRIEF DESCRIPTION OF THE DRAWINGS

The features, aspects, and advantages of the present invention will become apparent from the following description, and the accompanying exemplary embodiments shown in the drawings, which are briefly described below.

DETAILED DESCRIPTION

Figure 1:
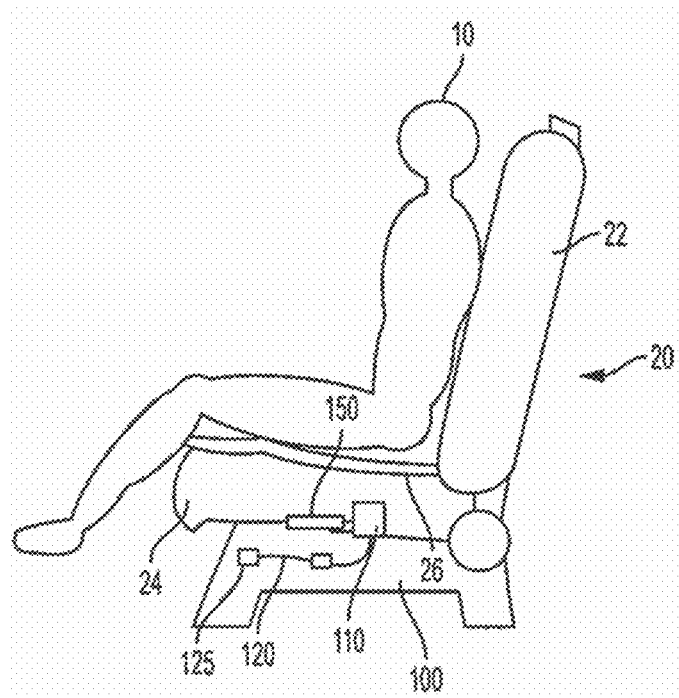
FIG. 1 is a side view of a vehicle seat containing an occupant detection system.

One aspect of the disclosure is directed to providing a fully differential programmable gain amplifier with improved performance and reduced component requirements. A device and methods are provided for accepting two differential input voltages and producing two differential output voltages, wherein the difference between the two output voltages is equal to the difference between the two input voltages.

According to an exemplary embodiment disclosed herein a sensing mat for use in a capacitive sensing system may include a conductor printed on a substrate. The conductor is operatively coupled to a sensing circuit configured to sense the presence of an object using a measure of the current through the conductor. The conductor is separated into a plurality of zones by resistive material that is printed on the substrate between portions of the conductor. The conductor and the resistive material both comprise ink. The sensing circuit is configured to independently sense the present of an object proximate to each of the zones of the conductor.

For purposes of this disclosure, the term "coupled" means the joining of two components (electrical, mechanical, or magnetic) directly or indirectly to one another. Such joining may be stationary in nature or movable in nature. Such joining may be achieved with the two components (electrical or mechanical) and any additional intermediate members being integrally defined as a single unitary body with one another or with the two components or the two components and any additional member being attached to one another. Such joining may be permanent in nature or alternatively may be removable or releasable in nature.

Exemplary embodiments may include program products comprising computer or machine-readable media for carrying or having machine-executable instructions or data structures stored thereon. For example, the occupant detection system may be computer driven. Exemplary embodiments illustrated in the methods of the figures may be controlled by program products comprising computer or machine-readable media for carrying or having machine-executable instructions or data structures stored thereon. Such computer or machine-readable media can be any available media which can be accessed by a general purpose or special purpose computer or other machine with a processor. By way of example, such computer or machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of computer or machine-readable media. Computer or machine-executable instructions comprise, for example, instructions and data which cause a general purpose computer, special purpose computer, or special purpose processing machines to perform a certain function or group of functions. Software implementations of the disclosed system could be accomplished with standard programming techniques with rule based logic and other logic to accomplish the various connection steps, processing steps, comparison steps and decision steps.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

It is also important to note that the construction and arrangement of the elements of the system as shown in the exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without material departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. The order or sequence of any process or method steps may be varied or re-sequenced according to alternative embodiments. Other substitutions, modifications, changes and omissions may be made in the design, operating conditions and arrangement of the exemplary embodiments without departing from the spirit of the present subject matter.

Various exemplary embodiments are disclosed herein. However, it is to be understood that the disclosed embodiments are merely exemplary and the disclosed devices, systems and methods may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the disclosed innovations.

FIG. 1 is a side view of a vehicle seat containing an occupant detection system. The disclosed occupant detection system 100 is configured to detect the presence of an occupant 10 in a vehicle seat 20. In one embodiment, the seat 20 includes a seat back 22 and a seat bottom 24. The seat bottom 24 may include a sensing mat 150 that includes at least one conductor or sensor. In another embodiment, seat upholstery or foam 26 may cover the seat bottom 24 and sensing mat 150. The sensing mat 150 may be an integrated foam sensor established in a shallow foam pocket of the seat foam 26.

The system 100 may include a controller 110 configured to detect changes in the capacitance of the sensing zones in the sensing mat 150 and provide data to a network or a vehicle communication bus (not shown) via the conductive wires contained in a wire harness 120, which is connected or coupled to the vehicle power and communication systems via a connector 125. As described herein the sensing zone may preferably be formed by a pair of conductive zones. Alternative, in the one conductive layer embodiment described herein a sensing zone is formed by a single conductive zone of the conducting material deposited on the mat (e.g., on a PET substrate).

Figure 2:
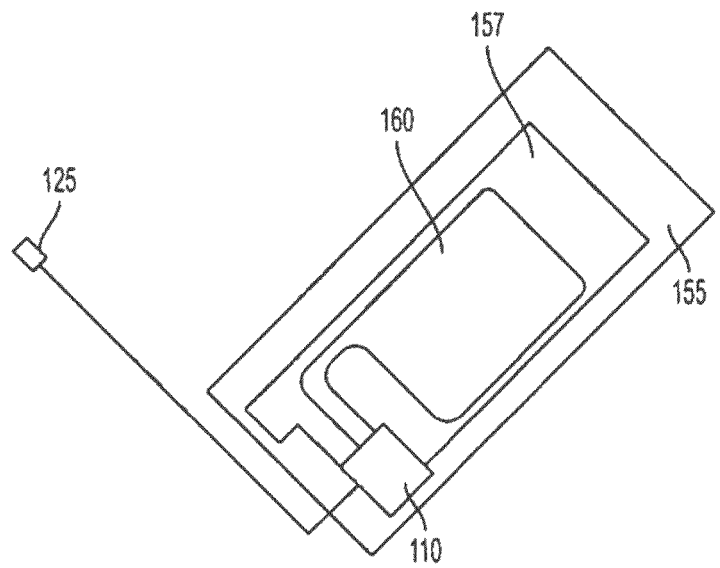
FIG. 2 is a top view of an embodiment of a sensor pad and controller that may be employed in the occupant detection system of FIG. 1.
Figure 3:
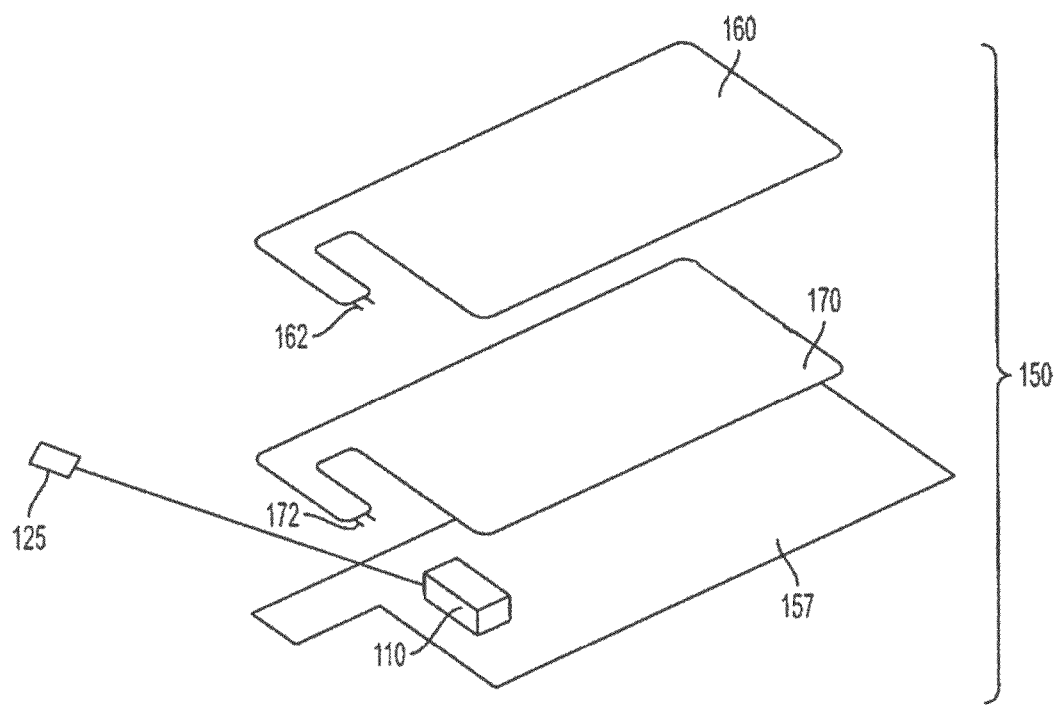
FIG. 3 is an exploded view of the sensor pad and controller shown in FIG. 2.
Figure 4:
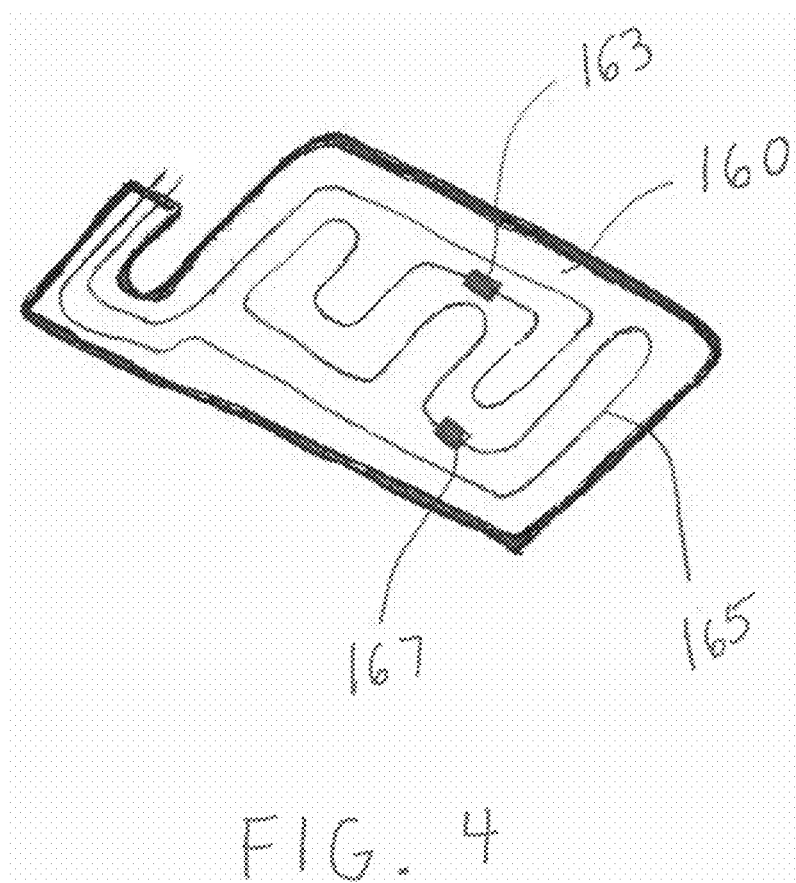
FIG. 4 is a perspective upward looking view of the upper base layer used in the sensor pad of FIG. 3.

FIG. 2 is a top view of an embodiment of a sensor pad and controller that may be employed in the occupant detection system of FIG. 1. FIG. 3 is an exploded view of the sensor pad and controller shown in FIG. 2. The sensing mat 150 may include an upper conductor layer 160 and a lower conductor layer 170. The conductor layers 160 and 170 may be spaced apart and may be mounted on a first substrate 157, which may comprise felt. The elements mounted on the first substrate 157 may then be mounted on a second substrate 155, which may comprise polyester fabric or high-density polyethylene (HDPE). In another embodiment, a single conductor layer is provided. In the case of a single layer, the conductor layer may be configured in a manner similar to the structure described herein such as shown in FIG. 4, for example.

The capacitance between the conductor layers may be monitored to determine a measure of the force on the seat 20, which may be associated with a person seated on the seat 20. Each of the conductor layers is connected or coupled to the controller 110 by electronic connectors 162 and 172. The electronic connectors 162 and 172 carry an electronic signal to and from each of the conductor layers 160 and 170. The electronic signals provided to the conductor layers may be a time varying voltage signal such as, for example, a sinusoidal signal. In the single layer embodiment, the impedance or current in the conduct may be monitored to determine the presence of the occupant.

Each of the conductor layers 160 and 170 is preferably a single sheet of plastic type film material. For example, polyethylene terephthalate (PET) film may be used for either or both of the conductor layers. Alternatively, other poly-based films such as PEN, PC, PI or PEI may be used for the conductor layer. Each of the conductor layers preferably includes a printed conductive material that forms the conductor, conductive trace or "wire" carrying the electronic signal through the conductor layer. Preferably, the conductor is an ink based material that may be printed onto the film. The conductive ink may include, for example, silver (Ag), silver/silver chloride (Ag/AgCl), and/or carbon. As described further below, carbon may be used to form the resistive zones or resistors in the sensing circuit. The conductive ink is preferably printed in a pattern on the film base layer.

The upper and lower conductor layers 160 and 170 may be spaced apart and may be separated by a spacer layer. The spacer layer includes dielectric material. The dielectric material may be an ink based material that may be printed on the lower conductor layer 170. As force is applied to the vehicle seat 20 (e.g., the seat bottom 24), the distance between at least a portion of the upper conductor layer 160 and the lower conductor layer 170 is allowed to decrease.

The controller 110 includes a sensing circuit and/or processor that determines a measure of the capacitance between the upper and lower conductor layers 160 and 170. A change in the measure of capacitance may be used by the system 100 to indicate the presence of an occupant 10 in the vehicle seat 20.

FIG. 4 depicts a conductor 165 printed on the upper conductor layer 160. Various portions of the conductor 165 may be separated by resistive zones 163 and 167, which may act as resistors in series with the rest of the circuit. Both the conductor 165 and the resistive zones 163 and 167 are preferably formed by printing ink onto the base layer. It should be noted that although there is an extensive disclosure regarding the formation of the resistance zones using printed material (e.g., Copper ink), it is also possible to form the resistance zones using standard resistors soldered to the substrate or mat material. The standard resistors may provide for enhanced accuracy of the detector. The conductor 165 could be characterized as being separated into zones by a resistive material or a resistive zone. Thus, in some instances herein the conduct 165 is referred to a conductive zone 165.

Figure 5:
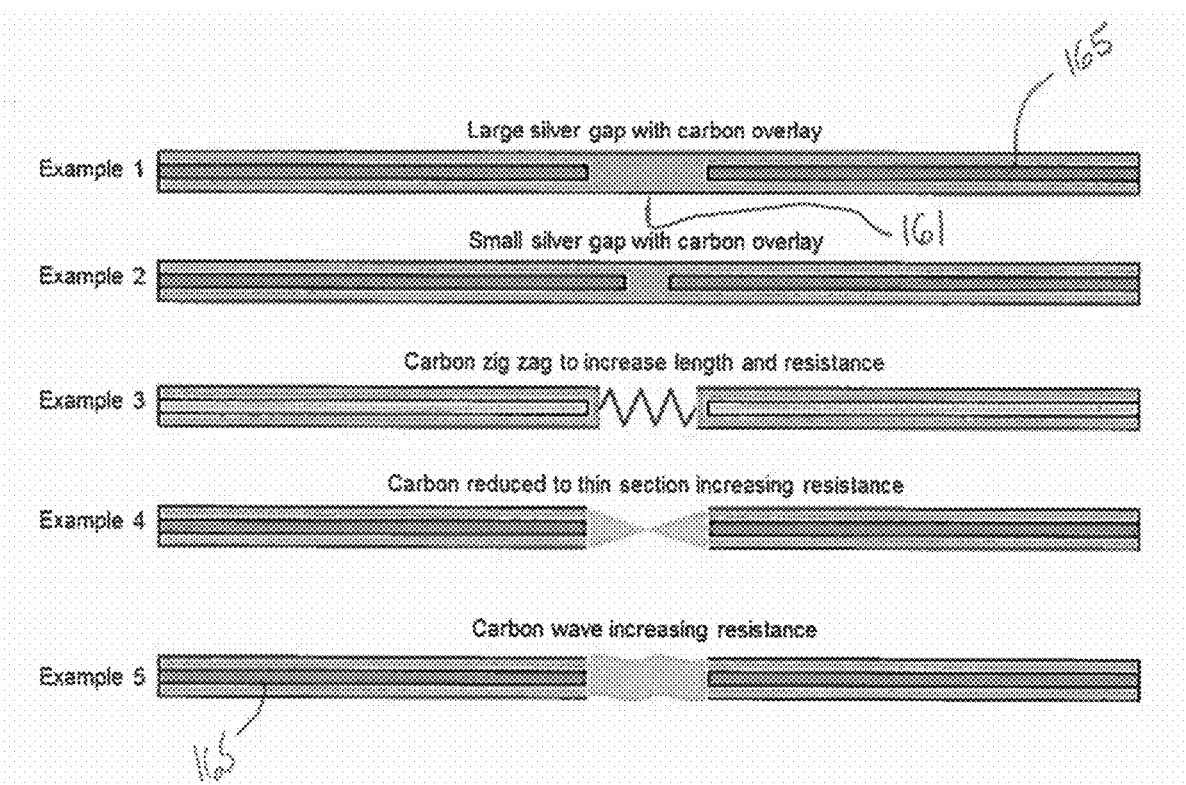
FIG. 5 is a top view of various embodiments of a portion of the conductor used on the base layers shown in FIG. 4.

FIG. 5 is a top view of various embodiments of a portion of the conductor used on the base layers shown in FIG. 4 and shows five examples of geometries for high conductivity and low conductivity materials that may be printed onto the base layers for sensing zones and resistive zones. The examples depict a conductor 165 separated by a resistive zone 161. The resistive zone 161 may be formed using carbon ink. In one embodiment, the conductive zone may be formed by using silver or silver chloride ink. Example 1 depicts a large gap between portions of the conductor 165, wherein the gap is filled with carbon ink. Example 2 depicts a relatively smaller gap containing resistive material between portions of the conductor 165. Example 3 depicts the resistive zone being formed using a zig-zag configuration of the carbon ink. Example 4 depicts the resistive zone being formed using an amount of the carbon ink that results in a resistance zone 161 with a narrow cross-section relative to the cross-section of the conductor 165. Example 5 depicts the resistive zone 161 being formed using a wave shaped configuration of the carbon ink.

Figure 6:
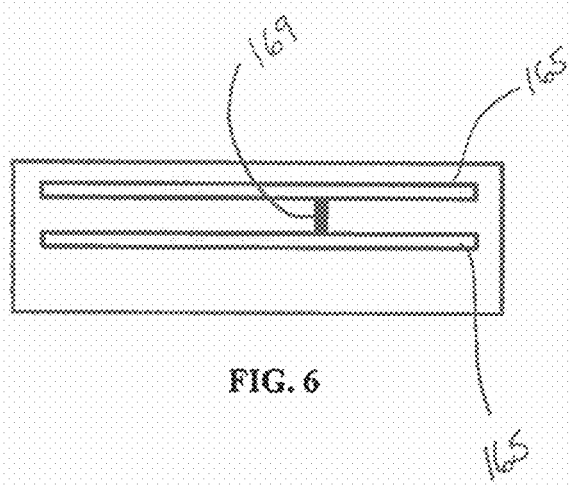
FIG. 6 is a top view of a portion of the conductor used in the base layers shown in FIG. 4.

FIG. 6 is a top view of a portion of the conductor used in the base layers shown in FIG. 4 and discloses a resistive zone 169 connecting two conductive zones 165. Although only one resistive zone 169 is shown in FIG. 6, one or more resistive zones could be used to provide resistance between the conductor 165 portions. In one embodiment, the resistance value of a resistive zone 169 is directly proportional to its length. Similarly, it is possible to use one or more resistive zones 169 in series to achieve a desired resistance value. For example, if a resistive zone 169 is 0.5 mm in length and provides 5,000 ohms of resistance, one could either increase the length of resistive zone 169 to 2.0 mm or configure four instances of resistive zone 169 in series to achieve a total resistance value of 20,000 ohms.

According to one embodiment, the ink could be deposition using a screening mesh. Thus, a conductive or resistance zone could represent a square section of a screening mesh. The ink could be deposited or screened through one square of the mesh. According to one embodiment, ink with a specification of 2.5 kohm/sq/25.4 um could be employed. The ink could be screened to a thickness of 12 um, which is approximately half of the thickness set forth in the specification (i.e., 25.4 um) resulting in a resistance for each square of 5 kohm.Resistor inks may be printed, for example, at a detail of 12 um thickness to help reduce impact of screen variance.

Thus, according to one embodiment, the manufacturer may deposit conductive or resistive ink through a square of a screening mesh to create a conductive zone 165 or resistive zone 169. According to one embodiment, the resistance value of a resistive zone 169 is directly proportional to the thickness of the ink deposit. Similarly to above, it is possible to configure the resistance value of resistive zone 169 by controlling the thickness of the resistive ink deposit while maintaining a fixed surface area. Conversely, it is possible to configure the resistance value of resistive zone 169 by controlling the surface area of the resistive ink deposit while maintaining a fixed thickness.

Figure 7:
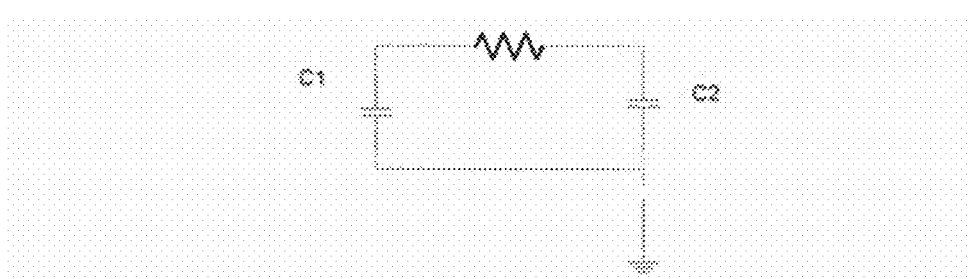
FIG. 7 is a simplified circuit diagram showing two sensing zones separated by a resistive zone.

FIG. 7 is a simplified circuit diagram showing two sensing zones separated by a resistive zone and shows a simple exemplary conductor that has two zones or cells separated by a resistor. In one embodiment, the leakage current to ground (traveling across capacitors C1 and C2) may be measured to determine the occupancy state of the zone (i.e. whether or not an occupant is seated above the zone). A voltage source (not shown) applies a signal to the resistor to create a current in the conductor.

Figure 8:
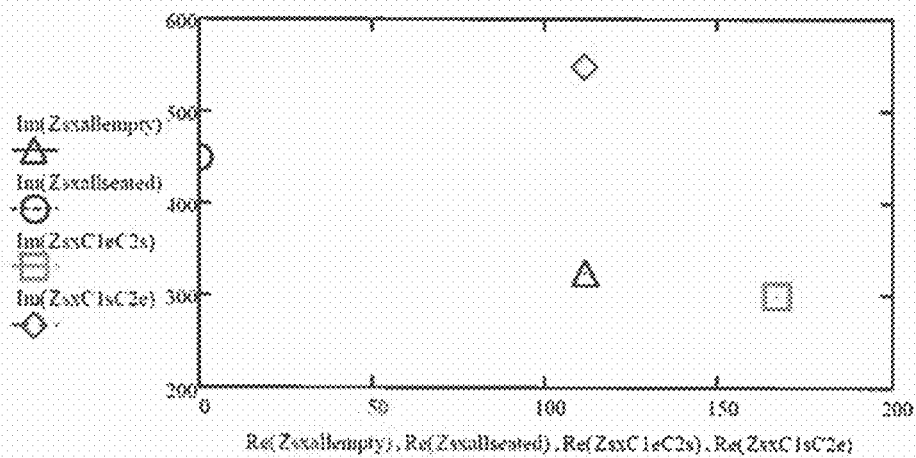
FIG. 8 is a graph of the complex impedance components detected in the circuit of FIG. 7 for various occupancy conditions of a vehicle seat.

FIG. 8 is a graph of the complex impedance components detected in the circuit of FIG. 7 for various occupancy conditions of a vehicle seat, depicted in units of 107 ohms. In one embodiment, these impedance components are represented as Real (Re) and Imaginary (Im) current for the current through the various conductor zones. The occupancy states for the two zones or cells are presented by points on the graph, where the triangle represents the state of both cells being empty, the circle represents both cells being occupied (seated), the square represents the first cell C1 as empty and the second cell C2 as occupied, and the diamond represents the first cell C1 as occupied and the second cell C2 as empty.

In one embodiment, it is possible to determine the real and imaginary impedance components of an electrical signal such that the system may identify which cells (e.g., a sensing zone) of the sensor mat 150 are occupied (i.e., proximate to the occupant) and which are not occupied (i.e., no occupant proximate to the cell) based on a unique complex impedance value.

Figure 9A:
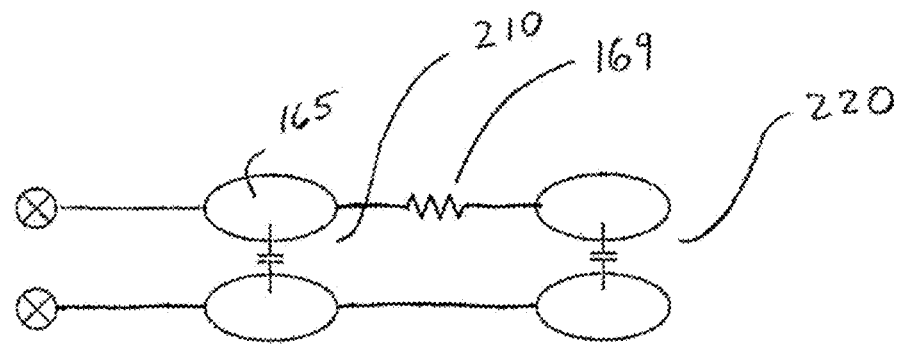
FIGS. 9A and 9B is a simplified circuit diagrams showing two sensing zones separated by one or two resistive zones.
Figure 9B:
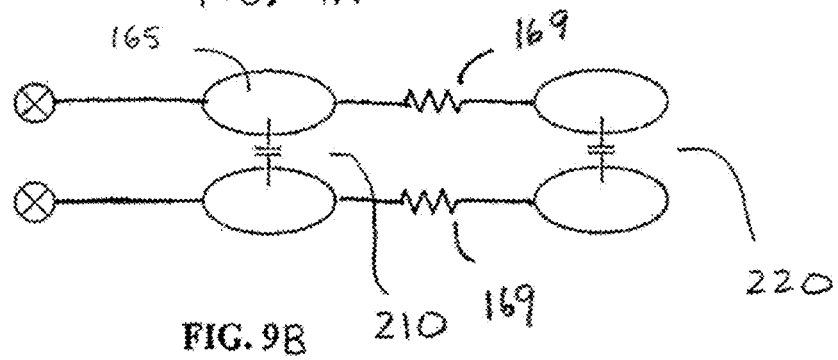
Figure 10A:
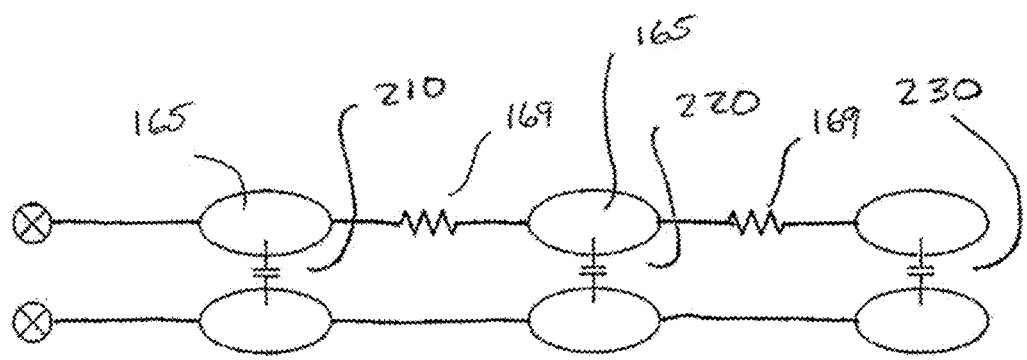
FIGS. 10A and 10B are simplified circuit diagrams showing three sensing zones separated by two or more resistive zones.
Figure 10B:
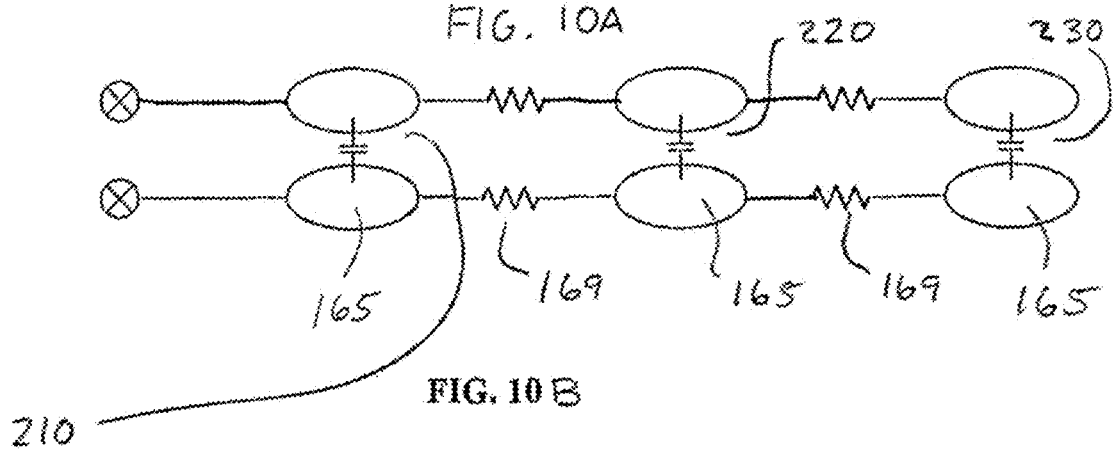

FIGS. 9 and 10 show various exemplary arrangements for a conductor used in an occupant detection system. The conductor includes various resistive zones to achieve more sensing zones or cells in the conductor. FIG. 9 shows two sensing zones separated by at least one resistor in the sensor feed line and an optional resistor in the sensor return line. In particular, FIG. 9A shows two sensing zones 210, 220. Each sensing zone is formed by a pair of conductive zones 165. The conductive zones 165 on one of the conductor layers (the top as shown in FIG. 9A) is separated by a resistive zone 169. In the simplified embodiment shown in FIG. 9B, the conductive zones 165 on both the top and bottom conductor layers are separated by resistive zones 169. FIGS. 10A and 10B are similar to FIGS. 9A and 9B. These two figures depict a sensing system of a sensing mat that includes three sensing zones 210, 220 and 230. As mentioned above for the embodiments shown in FIGS. 9A and 9B, the conductive zones 165 forming the sensing zones may optionally be separated by resistive zones 169 as shown in FIGS. 10A and 10B.

As described above, the sensor return (or feed) line may be a separate conductor or electrode (such as the shielding electrode) or may be a representation of sensing the current leaked or shunted to ground as a result of the presence or lack of an occupant in a vehicle seat. For example, with reference to FIG. 3, the upper conductor layer 160 may have a sensing electrode or conductor printed on the surface and the lower conductor layer 170 may have another sensing electrode or conductor printed on the surface. Each of these electrodes or conductors may be separated into zones using resistors such as shown in FIGS. 4, 9 and 10, for example.

The present disclosure has been described with reference to exemplary embodiments. However, persons skilled in the art will recognize that changes may be made in form and detail without departing from the spirit and scope of the disclosed subject matter. For example, although different exemplary embodiments may have been described as including one or more features providing one or more benefits, it is contemplated that the described features may be interchanged with one another or alternatively be combined with one another in the described exemplary embodiments or in other alternative embodiments. The technology of the present disclosure is relatively complex and thus not all changes in the technology are foreseeable. The present disclosure described with reference to the exemplary embodiments is manifestly intended to be as broad as possible. For example, unless specifically otherwise noted, the exemplary embodiments reciting a single particular element also encompass a plurality of such particular elements.

What is claimed is:

1. A system for detecting the presence of an occupant of a seat, comprising:
a sensing mat configured to be located in the seat, the mat including an upper conducting layer and a lower conducting layer, wherein at least one of the conducting layers comprises a printed electronic circuit separated into conductive zones by at least one resistive zone;
wherein the mat includes a plurality of sensing zones and each of the sensing zones include a conductive zone from the upper conducting layer and a conductive zone from the lower conducting layer, and
wherein each of the two conducting layers are connected to a controller configured to detect a change in capacitance of each of the sensing zones resulting from a change in distance between the upper conducting layer and the lower conducting layer; and
wherein the controller is connected to a vehicle network and is configured to provide data to the network and wherein the data indicates the absence or presence of the occupant in the seat.

2. The system of claim 1, wherein the at least one resistive zone comprises a resistive material printed on to one of the conducting layers.

3. The system of claim 2, wherein each of the conductive zones comprises a conductive material printed on to one of the conducting layers.

4. The system of claim 3, wherein an electronic circuit is configured to carry a signal through at least two conductive zones and the at least one resistive zone located between the at least two conductive zones.

5. The system of claim 1, wherein each of the conductive layers includes a terminal for connecting the sensing mat to the controller.

6. The system of claim 1, wherein the at least one resistance zone comprises a resistive material printed onto the substrate in a position to bridge a gap between at least two sections of a conductive material, wherein the resistance value of the resistive material is determined by the shape of the resistive material and the size of each gap.

7. A system for detecting the presence and determining the position of an occupant of a seat, comprising:
a sensing mat configured to be located in the seat, the mat including an upper conducting layer and a lower conducting layer, wherein at least one of the conducting layers comprises a printed electronic circuit separated into conductive zones by resistive zones;
wherein the mat includes a plurality of sensing zones and each of the sensing zones include a conductive zone from the upper conducting layer and a conductive zone from the lower conducting layer, and
wherein each of the two conducting layers are connected to a controller configured to detect a change in capacitance of each of the sensing zones resulting from a change in distance between the upper conducting layer and the lower conducting layer; and
wherein the controller is connected to a vehicle network and is configured to provide data to the network and wherein the data indicates the absence or presence of the occupant in the seat, and
wherein the controller, having determined there is an occupant present in the seat, is configured to provide further data to the network and wherein the further data indicates the position of the occupant in the seat.

8. The system of claim 7, wherein each of the resistive zones comprises a resistive material printed on to one of the conducting layers.

9. The system of claim 8, wherein each of the conductive zones comprises a conductive material printed on to one of the conducting layers.

10. The system of claim 9, wherein an electronic circuit is configured to carry a signal through at least two conductive zones and at least one resistive zone located between the at least two conductive zones.

11. The system of claim 10, wherein the sensor zones, having sensed an occupant of the seat in that zone, provides a unique change to the impedance of the signal carried through the electronic circuit.

12. The system of claim 11, wherein the controller determines which sensor zones are occupied based on the total impedance impact on the signal.

13. The system of claim 7, wherein each of the conductive layers includes a terminal for connecting the sensing mat to the controller.

14. The system of claim 7, wherein the printed electrical circuit comprises:
a conductive material printed onto a substrate so that a plurality of gaps exist between sections of the conductive material; and
a resistive material printed onto the substrate in a position to bridge the plurality of gaps between the sections of the conductive material, wherein the resistance value of the resistive material for each gap in the plurality of gaps is individually controlled by adjusting the shape of the resistive material or the size of each gap in the plurality of gaps;
wherein the electrical circuit is configured to carry an electrical signal through the sections of conductive material and across the plurality of gaps through the resistive material.

15. An electrical circuit, wherein the electrical circuit is printed onto a substrate, comprising:
a conductive material printed onto the substrate so that a plurality of gaps exist between sections of the conductive material; and
a resistive material printed onto the substrate in a position to bridge the plurality of gaps between the sections of the conductive material, wherein the resistance value of the resistive material for each gap in the plurality of gaps is individually controlled by adjusting the shape of the resistive material or the size of each gap in the plurality of gaps;
wherein the electrical circuit is configured to carry an electrical signal through the sections of conductive material and across the plurality of gaps through the resistive material.

16. The electrical circuit of claim 15, wherein the conductive material comprises silver.

17. The electrical circuit of claim 15, wherein the resistive material comprises carbon.

18. The electrical circuit of claim 15, wherein the resistive material bridging at least one of the plurality of gaps is printed in a zig-zag pattern.

19. The electrical circuit component of claim 15, wherein the thickness of the resistive material bridging at least one of the plurality of gaps is less than each of the sections of the conductive material.

20. The electrical circuit of claim 15, wherein the resistive material bridging at least one of the plurality of gaps is printed in a wave pattern.

\* \* \* \* \*